Nov. 27, 1951   F. T. COURT   2,576,780
TRACTOR MOUNTED CULTIVATOR
Filed May 28, 1945   2 SHEETS—SHEET 1
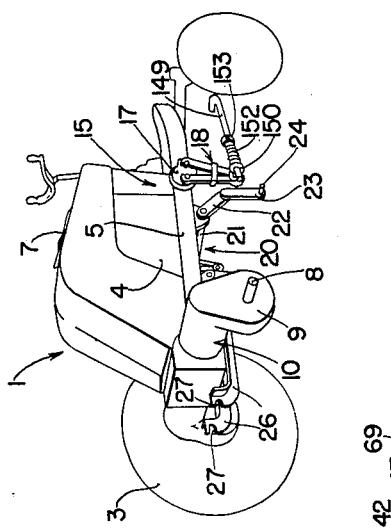
FIG. 1
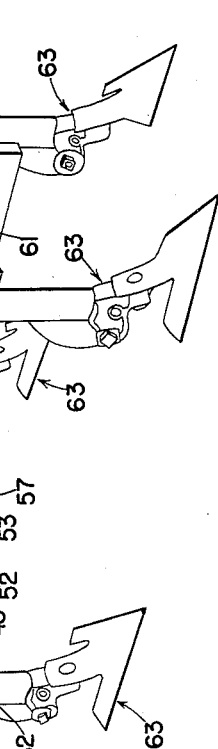
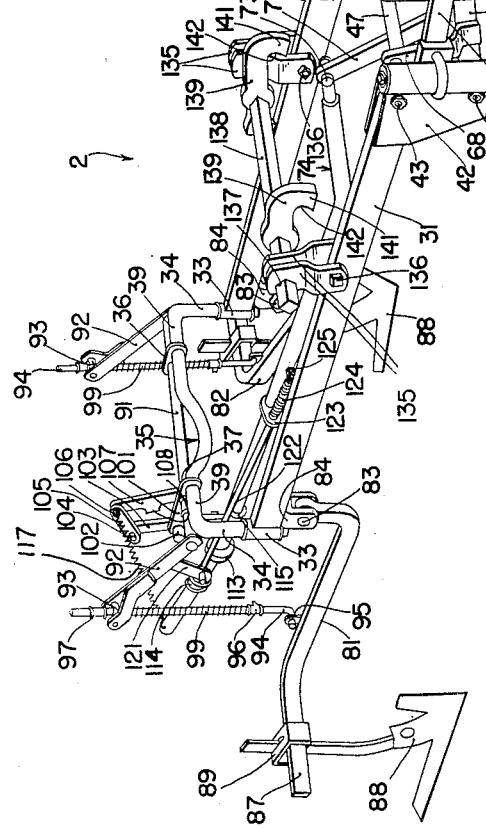
FIG. 2
WITNESS
E. B. Bjurstrom
INVENTOR.
FRANK T. COURT
BY 
ATTORNEYS Nov. 27, 1951   F. T. COURT   2,576,780
TRACTOR MOUNTED CULTIVATOR
Filed May 28, 1945   2 SHEETS—SHEET 2
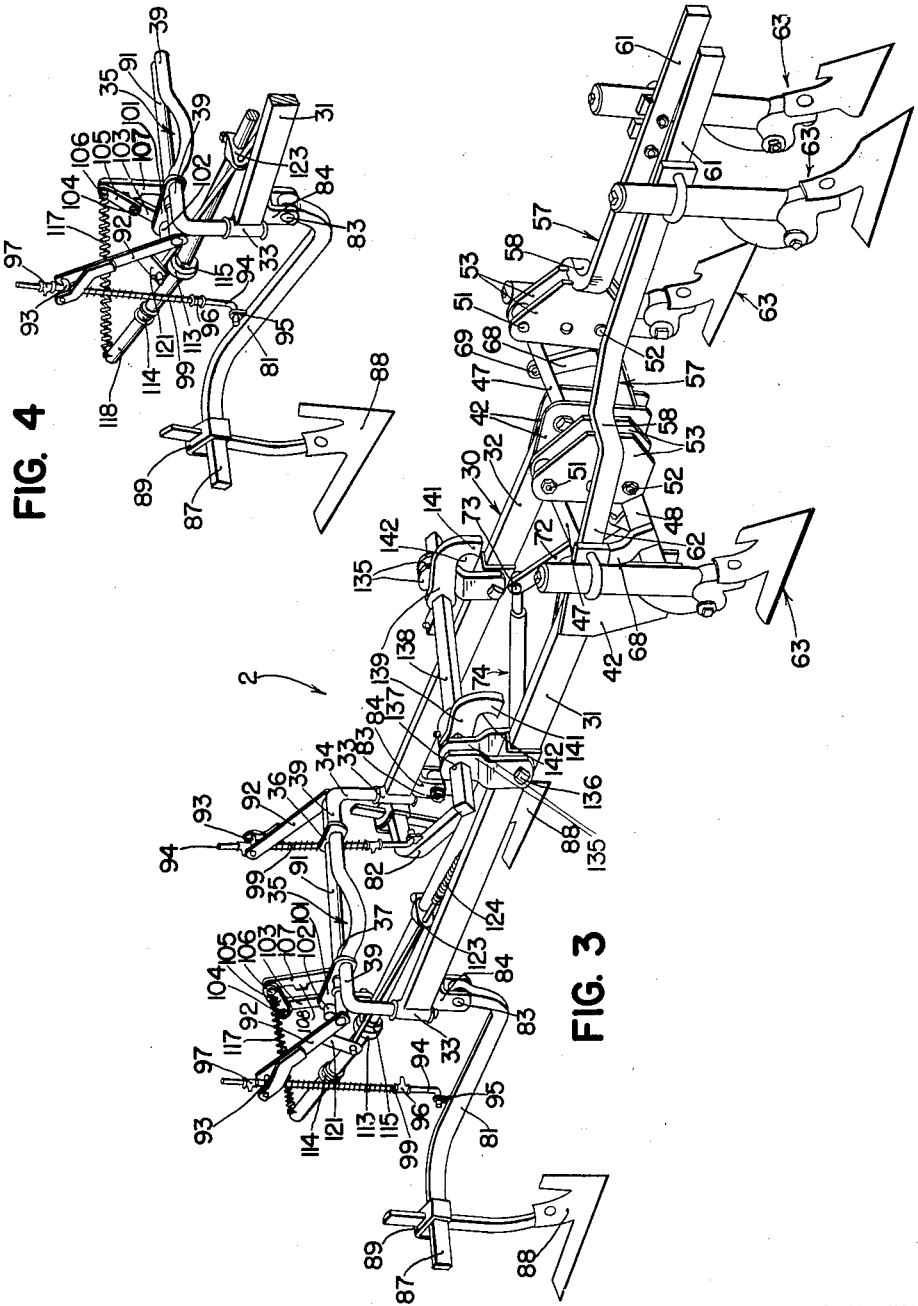
INVENTOR.
FRANK T. COURT
BY 
ATTORNEYS
WITNESS
C. B. Bjurstrom Patented Nov. 27, 1951

2,576,780

UNITED STATES PATENT OFFICE 2,576,780

TRACTOR MOUNTED CULTIVATOR

Frank T. Court, Moline, Ill., assignor to Deere & Company, Moline, Ill., a corporation of Illinois Application May 28, 1945, Serial No. 596,201

15 Claims. (Cl. 97—47)

The present invention relates generally to agricultural implements and more particularly to implements of the integral type, that is, implements adapted to be supported substantially entirely on the tractor.

The object and general nature of this invention is the provision of a quick-detachable implement adapted to be readily connected to the tractor by power derived from the tractor power lift, and a further important feature of this invention is the provision of a novel cultivator of the tractor mounted type especially constructed to provide for ready and convenient adjustment of the tools laterally relative to the tractor and also for adjustment to a position to readily accommodate the movement of the tractor away from the implement when the latter is to be disconnected therefrom. More specifically, it is a feature of this invention to provide for connection and disconnection of the implement relative to the tractor by operation of the power lift, and in which the means that connects and disconnects the tractor from the implement also automatically provides for shifting the front tools toward and away from a position adjacent one another facilitating passage of the tractor over a portion of the implement into and out of a position mounting the implement on the tractor.

These and other objects and advantages of the present invention will be apparent to those skilled in the art after a consideration of the following detailed description, taken in conjunction with the accompanying drawings in which one preferred form of the present invention has been illustrated.

In the drawings:

Figure 1 is a fragmentary view of a farm tractor of the type particularly adapted to receive an implement, such as the tractor cultivator just referred to.

Figure 2 is a perspective view of the implement showing the same in the position the parts occupy when the implement is mounted on the tractor and in operating position. In Figure 2, however, the showing of the tractor has been eliminated for purposes of clarity.

Figure 3 is a view similar to Figure 2, showing the implement detached from the tractor, with the parts of the implement in a position to facilitate driving the tractor away from the implement. This is also the position in which the implement parts are disposed when the implement is to be mounted on the tractor.

Figure 4 is a fragmentary view showing the rear portion of the implement with the parts thereof in the positions they occupy when the implement is mounted on a tractor and the front and rear tools of the implement raised into their transport position.

Referring now to the drawings, particularly Figure 1, the reference numeral 1 indicates a farm tractor and the reference numeral 2 indicates the implement that may, according to the principles of the present invention, be readily disconnected from or connected to the tractor 1. The latter comprises more or less conventional structure, so far as the present invention is concerned, and embodies rear supporting wheels 3, a power plant 4 and a frame 5. The tractor 1 has an operator's seat 7 disposed above and/or forwardly of the motor 4, and the rear traction wheels 3 are connected to stub axles 8 that are journaled for rotation in a pair of drop housings 9 forming a part of a rear axle structure 10 in which power driven axle shafts are mounted.

The tractor 1 is provided with a power lift apparatus indicated in its entirety by the reference numeral 15, which may take any suitable form, but which preferably is similar to that shown in my co-pending application, Serial No. 561,433, filed November 1, 1944, and issued September 20, 1949, as Patent No. 2,482,249. The power lift apparatus 15 is connected in any suitable way with a transverse rockshaft 17 to which a pair of operating arms 18, one at each side of the tractor, is fixed. The shaft 17 is also connected with implement lifting and locking means indicated in its entirety by the reference numeral 20. These power lift connections, including implement lifting and locking means, are substantially identical, for all practical purposes, with the operating and lifting and locking mechanisms shown in my co-pending application, Serial No. 577,577, filed February 12, 1945, to which reference may be made if necessary. Briefly, the implement lifting and locking mechanism 20 includes a transverse shaft 21 to which arms 22 are fixed, the shaft 21 being connected to be operated, at the option of the operator, from the rockshaft 17. Links 23 are connected with the outer end of the arms 22 and at their ends the links 23 carry studs 24. At the rear of the tractor, preferably at each side thereof is a bracket 26 fixed to the tractor in a firm and rigid manner, and each bracket 26 has a rearwardly facing socket or opening 27 which is tapered and which form implement-receiving means at the rear of the tractor. The slots or notches 27 are tapered rearwardly to facilitate backing the tractor into a position to engage the brackets 26 with the rear portion of the implement. Then, as more clearly disclosed in my co-pending application, Serial No. 577,577, the lower ends of the links 23 may be engaged with the front portion of the implement, whereupon by operating the power lift the implement may be drawn upwardly into firm rigid connection with the tractor and locked thereto by the links and arms 22 and 23 passing overcenter.

The power operated mechanism for engaging, lifting and locking the implement onto the tractor forms the subject matter of my co-pending application Serial No. 577,577, and is explained in detail therein.

The present invention is more especially concerned with a particular kind of implement especially adapted for use with a tractor and lifting and locking apparatus such as those referred to above. Referring now more particularly to Figures 2 and 3, the implement 2 comprises frame means 30, which includes right and left hand beam members 31 and 32 normally disposed generally longitudinally of the tractor and including vertical sleeve sections 33, one at the rear end of each of said beams. The sleeve sections 33 receive the downturned ends 34 of a transverse frame member 35 which is made up of a pipe or shaft section having the downturned ends 34 just mentioned and carrying a pair of brackets 36 and 37 rigidly fixed, as by welding, thereto. The brackets 36 and 37 are spaced so that sections 39 are provided on the member 35 to receive the tapered notches or sockets 27 on the tractor 1. The beams 31 and 32 are free to swing laterally, toward and away from one another about their rear connections with the downturned ends 34 of the member 35.

Secured to each end of the beam members 31 and 32 is a pair of bracket plates 42 apertured to receive pivots 43 and 44 by which a pair of generally parallel links 47 and 48 are connected thereto. The forward ends of each pair of links 47 and 48 is connected by pivots 51 and 52 to a pair of bracket plates 53. The front edge of each of these plates is notched to receive a cultivator rig beam 57, the latter having a laterally bent section 58 welded or otherwise fixed to the notches just mentioned. Each cultivator rig beam includes a forward section 61 and a rearwardly directed section 62, and to each of these sections one or more cultivator shovel units 63 are fixed by suitable clamping means. By virtue of the parallel link connection 47, 48, each rig beam 57 is arranged for generally vertical shifting movement with respect to the frame 30. An arm 68 is connected to each of the lower links 48 and is apertured at its upper end as at 69 to receive the forward end of a link member 149, the rear end of which is suitably connected to the power lift arm 18, as shown in Figure 1. A third arm 72 is also connected at its lower end to the right hand parallel link member 48 and is apertured to receive a pivot pin 73 by which the front end of a generally longitudinally extending member 74 is connected thereto.

A pair of rear tool beams 81 and 82 is pivoted, as at 83, to the rear ends of the main beam members 31 and 32, the pivots 83 being carried by brackets 84 fixed to the beams 31 and 32. Each of the rear rig beams 81 and 82 is provided with a laterally outturned section 87 to which a rear tool 88 is connected by suitable clamping means 89. Each of the brackets 36 and 37 is apertured to receive a rear cross shaft 91 to each end of which an arm 92 is fixed. The rear end of each of the arms 92 is connected by a swivel 93 to the upper end of a lifting link 94, the lower end of which is pivoted to a lug 95 carried by the rig beam associated therewith. A compression spring 99 is disposed between the swivel 93 and an adjusting collar 96. A second collar 97 is carried adjustably at the upper end of each of the lifting rods 94. By swinging the arms 92 upwardly the tool beams 81 and 82 may be raised, and by forcing the arms 92 downwardly the springs 99 are compressed and act to force the tools 88 into the ground. The shaft 91 is rocked so as to raise and lower the tools 88 according to the raising and lowering of the front tools 63. To this end, the right hand bracket 37 is extended, as at 101, and carries a pivot pin 102 by which a lever 103 is swingably connected at an intermediate point thereto. The upper end of the lever 103 is pivoted, as at 104, to a link 105, the forward end of which is connected, as at 106, to the upper end of an arm 107 that is fixed to the rockshaft 91. The lower end of the lever 103 carries a swivel eye member 113, and this member is normally movable along the rear end of the longitudinally extending member 74 between a set screw collar 114 and a fixed collar 115, which may be welded or otherwise fixed to the rod 74. A fairly heavy spring 117 is connected between the outer end 118 of the rod or pipe member 74 and the upper end of the arm 107 for a purpose which will be explained in detail later. The right hand arm 92 is provided with an extension 121 which is pivoted to receive the rear end of a rod 122, the forward end of which passes through an opening in a bracket 123 fixed to the longitudinally extending member 74. A spring 124 is disposed about the front end of the rod 122 and is confined between the bracket 123 and an adjusting nut 125 on the front end of the rod 122.

The main beam members 31 and 32, which preferably are hollow, carry pairs of brackets 135 which are bolted, as at 136, or otherwise secured to the beam members. The upper or outer end of each of the brackets 135 is provided with a square opening 137, and mounted in these square openings 137 is a square shaft or rod 138. Arms 139 are fixed to the square rod 138 and have hook ends 141 which form sockets or notches 142. The square shaft member 138 fits fairly snugly in the square openings 137 but there is sufficient looseness to permit the beams 31 and 32 to be swung toward or away from one another when no force is applied to the arms 139. If, for example, however, a lifting force should be applied to the arms 139, tending to rock the square shaft 138, the shaft clamps the edges of the openings in the lugs 135 and by such clamping action secures the beams 31 and 32 against lateral displacement.

The operation of the implement described above is substantially as follows. Referring first to Figure 3, which shows the implement 2 detached from the tractor and resting on the ground, the front tools 63 bear on the ground surface, as do the rear tools 88. However, the rear end of the frame 30 is held in an elevated position, particularly the cross member 35, by virtue of the spring 117 which exerts substantially sufficient force to prevent the rear end of the frame from sagging downwardly. By bringing the front ends of the beams 31 and 32, and also the front ends of the rig beams 57, close together, the tractor 1 may be backed into position over the tools and implement frame until the notches or tapered openings 27 on the tractor engage the sections 39 of the implement cross frame bar 35. When this engagement is effected the tractor is stopped and the operator dismounts and swings the arms 23 downwardly, bringing the studs 24 into the sockets 142 on the arms 139. The operator then mounts the tractor and operates the power lift. This swings the arms 22 forwardly and upwardly, which exerts a forward and upward force on the arms 139. The upward force applied to the arms 139 tend to rock the square shaft 138 slightly in the lug openings, and this will immediately clamp the bar 138 to the lugs and thus hold the beams 31 and 32 in laterally spaced apart position. For this reason, it is necessary for the operator before operating the power lift to separate the front tools 63, preferably shifting them, together with the main beam members 31 and 32, into some such position as is illustrated in Figure 2, for example. Then the operator actuates the power lift and causes the arms 22 to swing the links 23 upwardly and finally into an overcenter position in which the frame 30 is then locked to the tractor. At the same time, of course, the lateral adjustment of the tools is secured and retained by the continued upward force directed to the socket ends of the arms 139, which keeps the square shaft clamped to the lugs 135.

Lastly, the rod 149 connecting the power lift arms 18 with the arms 68 on the lower links 48 are connected by installing suitable pivots, and since the longitudinally extending rod or pipe member 74 connects the rear tools with the front tools, operating the power unit on the tractor to swing the arms 18 causes the front and rear tools to raise or lower to different operating depths. Also, the power lift unit on the tractor may be actuated to swing both sets of tools upwardly into their transport or fully raised position.

More specifically, when the front tools are raised, as by swinging the power lift arms 18 on the tractor rearwardly, a rearward thrust is exerted through the longitudinally extending member 74, bringing the fixed collar 115 up against the swivel eye member 113. This swings the arm 103 into a position in which it passes overcenter with respect to the link 105, swinging the arm 107 forwardly. The arm 107 carries a stop lug 108 which limits and defines the aforesaid overcenter positions. This forward movement of the arm 107 acts through the lifting arms 92 to raise the rear tools. The outfit may then be driven to a field for operation, and when that field is reached and it is desired to begin cultivating, the operator actuates the power lift to swing the arms 18 forwardly the amount necessary to secure the desired depth of operation. Generally, each arm 18 carries a collar 150 through which the rod 149 slides, there being a spring 152 and an adjusting collar 153 on the rod 149 so that the tools are held in their operating position by yielding means, similar to the yielding provided by the rear springs 99.

It will be noted, particularly from Figure 4, that the collar 114 is a substantial distance rearwardly of the fixed collar 115. Therefore, when the front tools are lowered into their operating position, resulting in a forward movement of the longitudinally extending pipe member 74, the rear tools are held up in their transport or fully raised position by the overcenter links 103, 105, the tools being retained in their raised position until the front tools 63 start to work the soil. At about this point, depending upon the position of adjustment of the collar 114, the latter comes into engagement with the swivel eye member 113 so that continued forward movement, first, breaks the toggle overcenter lock 103, 105, and second, permits the rear tools to lower immediately, aided in this action by the spring 117, if necessary. Thus, by virtue of this delayed action, the rear tools are not lowered into operating position until substantially the point on the ground where the front tools initially began their operation. Continued forward movement of the longitudinally extending member 74 as the front tools move downwardly to their final depth of operation results in the rearward swinging of the arm 107 and the arms 92, thus applying further downward pressure through the springs 99 against the rear tools.

When it is desired to raise the tools into a transport position, as at the end of a row, the power lift unit is operated to swing the arms 18 rearwardly, thus moving the parallel links 47, 48 upwardly. This movement causes the longitudinally extending member 74 to be thrust rearwardly. However, by virtue of the space between the collars 114 and 115, a lost motion connection is provided so that, in effect, the front tools are raised substantially out of the ground before the fixed collar 115 comes up against the swivel eye 113, which then begins the lifting action of the rear tools. However, the arm 72 is longer than the arms 68 so that by the time the front tools are raised into their fully raised position, the rear tools have also been raised into their fully raised position and, additionally, the links 103 and 105 have gone overcenter. Thus, at the end of the row, the rear tools are not lifted out of the ground until about the point along the surface of the ground where the front tools were raised. It will be observed that this action takes place automatically and without attention on the part of the operator except the single duty of operating the power lift to raise or lower the tools. The amount of lost motion, and hence the point of operation of the rear tools relative to the front tools, may be adjusted by changing the relative positions of the set screw collar 114 and the set screw collars 96 and 97.

When it is desired to disconnect the implement 2 from the tractor 1, all that the operator has to do is disconnect the rods 149 from the arms 68 and then operate the power lift to swing the lifting and locking arms 22 downwardly. This permits the rear end of the frame to disconnect from the tractor brackets 26 and also permits the links 23 to be swung manually away from the sockets 142 in the arms 139. The operator then moves the front ends of the cultivator rigs 61 toward one another so as to narrow the implement, into the position shown in Figure 3. The tractor may then be driven forwardly and away from the implement without colliding with any of the parts. The spring 117 serves to hold the rear end of the frame up into a position to facilitate reengagement of the tapered sockets 27 with the sections 39 on the rear cross frame member 35, whenever it is desired to reattach the implement to the tractor.

While I have shown and described above the preferred structure in which the principles of the present invention have been incorporated, it is to be understood that my invention is not to be limited to the particular details shown and described above, but that, in fact, widely different means may be employed in the practice of the broader aspects of my invention.

What I claim, therefore, and desire to secure by Letters Patent is:

1. An implement adapted to be mounted on a tractor, said implement comprising a frame adapted to extend generally longitudinally of the tractor and to be mounted thereon, front and rear tools, means for connecting said front and rear tools with said frame for generally vertical movement into and out of raised and lowered positions, means carried by the rear portion of said frame and connected with said rear tools for holding the rear tools in a raised position, means connected with said front tools for raising them into a transport position, means operated by the raising of said front tools for raising said rear tools, said raising means comprising a generally longitudinally extending member connected at its front end with the front tools and having a lost motion connection with said rear tools, means carried by the rear portion of said longitudinally extending member and acting against said rear tool holding means for moving the latter into a position for holding the rear tools in a raised position when said front tools are moved into their raised position, and means also carried by the rear portion of said longitudinally extending member and engageable with said rear tool holding means for moving the latter into a position to permit the rear tools to lower.

2. A tractor mounted implement comprising a frame, front and rear tools connected, respectively, with said frame for generally vertical movement relative thereto, means connected with said front tools for raising and lowering the latter, a longitudinally shiftable member operatively connected at its front end with said front tools and extending rearwardly to a point adjacent said rear tools, means having a lost motion connection with the rear portion of said longitudinally extending member for moving said rear tools into a raised position, an overcenter linkage connected between the rear portion of said frame and said rear tool moving means for releasably holding said rear tools in a raised position, and means operated by movement of the rear portion of said longitudinal member for releasing said overcenter means so as to provide for lowering said rear tools.

3. An agricultural implement comprising a frame, front tool means swingably connected with the front end portion of said frame, rear tool means swingably connected with the rear end portion of said frame, means connected with said front tool means and reacting against said frame to raise and lower said front tool means, means including a pair of pivotally interconnected links connected between said frame and said rear tool means and movable into an overcenter position to hold said rear tool means in a raised position, and a shiftable connection between said front tool means and said links and operative when said front tool means has been lowered to shift said links out of their overcenter position and release said rear tool means for lowering.

4. An agricultural implement comprising a frame, front tool means swingably connected with the front end portion of said frame, rear tool means swingably connected with the rear end portion of said frame, means connected with said front tool means and reacting against said frame to raise and lower said front tool means, a rockshaft mounted on the rear portion of said frame, said rear tool means including a pair of tool beams, a pair of arms on said rockshaft operatively connected with said tool beams, and means operatively connecting said front tool means with said rockshaft whereby said rear tool beams may also be raised and lowered.

5. An agricultural implement comprising frame means, front and rear tools movably connected therewith, and adapted to have independent movement, means reacting against the frame for raising and lowering the front tools, an arm pivoted on said frame means adjacent the rear tools and operatively connected to move therewith when said rear tools are raised and lowered, a lever pivoted to said frame adjacent the rear thereof, a link pivotally connecting the outer end of said lever with the outer end of said pivoted arm, said lever and link being adapted to be disposed in an overcenter position to hold said rear tools against downward movement, means having a lost motion connection with said lever and connected with said front tools to be shifted by movement of said front tools when they are lowered, said lost motion being taken up by the initial lowering of said front tools, further movement of said connecting means serving to shift said lever and link out of their overcenter position, thereby providing a delayed action between the lowering of the rear tools relative to the lowering of said front tools.

6. In an agricultural implement, such as a cultivator, frame means, front and rear tools, means movably connecting said front and rear tools with said frame means, releasable holding means acting between said frame means and said rear tools to hold the rear tools in elevated position, means acting against said frame means and connected with said front tools for raising and lowering the front tools, a longitudinally extending connection connected at its front end with said front tools, means for operating said holding means including a part with respect to which the rear portion of said longitudinally extending connection is slidable, and spaced collars on the rear portion of said longitudinal connection and operative after a given extent of movement has occurred to engage and shift said part.

7. The invention set forth in claim 6, further characterized by spring means associated with said longitudinally extending connection and actuated thereby for forcing the rear tools downwardly.

8. In a cultivator, a frame, a pair of cultivator rigs, means movably connecting said rigs with said frame, a rockshaft movably mounted on said frame and having arms operatively connected with said rigs, respectively, a pair of toggle links connected between said frame and said rockshaft and operative in one position to hold said rigs against downward movement, a generally longitudinally extending part movable relative to said frame, and abutment means carried by said part operative when said part is moved in one direction to shift said toggle links into a position to permit said rigs to lower.

9. The invention set forth in claim 8, further characterized by a second abutment means on said longitudinal member and acting against said links when said longitudinal member is shifted in the other direction to raise said rigs and shift said toggle links into locked relation.

10. In a cultivator, a supporting frame, a pair of cultivator rigs connected with said frame for generally vertical movement, means movably connected with said frame and rigs for raising and lowering the latter, an operating member mounted for generally longitudinal movement relative to said frame, a lever pivotally mounted on said frame, a link connected between one end of said lever and said raising means, means carried by the other end of said lever for slidably receiving said operating member, a pair of spaced apart abutments on said operating member disposed on opposite sides of said last mentioned means, one of said abutments acting against said last mentioned means when said operating member is moved in one direction to shift said lever to lower said rigs and the other abutment acting against said last mentioned means when said operating member is moved in the other direction to raise said rigs and swing said lever and link into an overcenter locking position, front tool means movably connected with said frame means, means connecting said operating member with said front tool means, there being sufficient space between said abutments so that the front tool means is raised or lowered before the raising or lowering of said rear tool means.

11. An agricultural implement comprising a frame, generally fore and aft spaced tools movably connected therewith, means connecting the rear tools with the rear portion of the frame including a pair of overcenter links, one of said links including a section shiftable generally in a fore and aft direction for shifting said links into and out of an overcenter position, means connected with the front tools and said section for operating said links by the movement of said front tools, and means connected with said front tools for raising and lowering the latter, the connection between said longitudinal member and said section including lost motion means whereby initiation of the raising movement of the rear tools occurs subsequent to the initiation of the raising movement of the front tools.

12. An agricultural implement comprising a frame including a rear transverse member, bracket means carried by said transverse member, tool means swingably connected with the rear portion of said frame, a rockshaft on said brackets, means connecting said rockshaft with said tool means whereby swinging of said rockshaft serves to raise and lower said tool means, a lever mounted on said bracket means, an arm fixed to said rockshaft, a link pivotally connected to said lever and said arm, whereby movement of said lever acts through said arm to rock said rockshaft and raise or lower said tools, said lever and link passing into an overcenter position when said tool means is raised, and a longitudinally shiftable member having a lost motion connection with said lever for operating the latter in opposite directions.

13. An agricultural implement adapted to be detachably connected with a tractor, comprising a frame, front and rear tools movably connected with the front and rear portions, respectively, of said frame, a generally fore and aft shiftable member connected at its front end with said front tools, a rockshaft mounted on the rear portion of said frame and operatively connected with said rear tools for raising and lowering the latter relative to said frame, an arm on said rockshaft, connecting means between said arm and the rear portion of said longitudinal frame for rocking said rockshaft and raising and lowering said rear tools when said front tools are raised and lowered, and spring means acting between the rear portion of said longitudinal member and said arm and reacting through said longitudinal member against said front tools for holding the rear portion of said frame in an elevated position when the frame is detached from the tractor and the rear end thereof supported on the rear tools.

14. An implement comprising frame means, front and rear tools connected therewith and adapted to be raised and lowered relative to said frame means, means connected with the front tools and reacting against said frame means for raising and lowering said tools, a connection between the front and rear tools, said connection including lost motion means whereby said front tools may be raised and lowered through at least a part of their range of movement relative to said rear tools, releasable means acting between said frame means and said rear tools for holding said rear tools in a raised position, and means actuated by movement of said connecting means between said front tools and said rear tools when said front tools are moved into their operating position for releasing said holding means to permit the rear tools to lower.

15. A tractor mounted implement comprising front and rear tools connected, respectively, with the tractor for generally vertical movement relative thereto, means for moving said rear tools into and out of raised and lowered positions, including a longitudinally movable member and a part having a lost motion connection with said member and operatively connected with said rear tools, on overcenter locking means connected between said rear tools and the tractor for releasably holding said rear tools in a raised position, means on said longitudinally movable member engageable with said overcenter locking means for releasing the latter, and means operated by the front tools for shifting said longitudinally movable member.

FRANK T. COURT.

REFERENCES CITED

The following references are of record in the file of this patent:

UNITED STATES PATENTS

| Number | Name | Date |
| --- | --- | --- |
| 2,181,824 | Stuva | Nov. 28, 1939 |
| 2,309,158 | Benjamin | Jan. 26, 1943 |
| 2,362,695 | Hipple | Nov. 14, 1944 |